(12) United States Patent
Li et al.

(10) Patent No.: US 12,340,589 B2
(45) Date of Patent: Jun. 24, 2025

(54) COMPUTER-IMPLEMENTED METHOD, NON-TRANSITORY COMPUTER READABLE STORAGE MEDIUM STORING A COMPUTER PROGRAM, AND SYSTEM FOR VIDEO SURVEILLANCE

(71) Applicant: MILESTONE SYSTEMS A/S, Brøndby (DK)

(72) Inventors: Zenjie Li, Brøndby (DK); Kamal Nasrollahi, Brøndby (DK)

(73) Assignee: MILESTONE SYSTEMS A/S, Brøndby (DK)

( * ) Notice: Subject to any disclaimer, the term of this patent is extended or adjusted under 35 U.S.C. 154(b) by 107 days.

(21) Appl. No.: 18/483,191

(22) Filed: Oct. 9, 2023

(65) Prior Publication Data

US 2024/0119737 A1  Apr. 11, 2024

(30) Foreign Application Priority Data

Oct. 10, 2022  (GB) ..................................... 2214928

(51) Int. Cl.
| | |
|---|---|
| *G06N 5/02* | (2023.01) |
| *G06N 5/00* | (2023.01) |
| *G06V 20/40* | (2022.01) |
| *G06V 20/52* | (2022.01) |
| *G06N 3/00* | (2023.01) |
| *G06N 7/00* | (2023.01) |

(52) U.S. Cl.
CPC ............... *G06V 20/52* (2022.01); *G06N 5/02* (2013.01); *G06V 20/44* (2022.01); *G06V 2201/07* (2022.01)

(58) Field of Classification Search
CPC .. G06N 5/02; G06N 5/00; G06N 3/00; G06N 7/00; G06N 10/00; G06N 20/00; G06V 20/44; G06V 20/52; G06V 2201/07; G06V 10/00; G06V 20/00; G06V 30/00; G06V 2201/00; G06V 40/00
USPC .......................................... 348/61, 47, 48, 73
See application file for complete search history.

(56) References Cited

U.S. PATENT DOCUMENTS

| | | | |
|---|---|---|---|
| 2018/0308243 A1 | 10/2018 | Justice | |
| 2020/0210762 A1* | 7/2020 | Shrestha | ................. G06V 20/47 |
| 2022/0150442 A1* | 5/2022 | Marier | ............... H04N 21/4223 |

(Continued)

FOREIGN PATENT DOCUMENTS

| | | |
|---|---|---|
| CN | 106295594 B | 10/2019 |
| EP | 4002853 A1 | 5/2022 |

(Continued)

*Primary Examiner* — Daquan Zhao
(74) *Attorney, Agent, or Firm* — Canon U.S.A., Inc. IP Division

(57) ABSTRACT

A computer-implemented method of video surveillance comprising the steps of: querying a knowledge graph representing a plurality of video cameras as ontology entities connected by edges, in order to identify, based on a first video camera providing a first video stream that can be fed to at least one first application program to obtain first analytics data, one or more second video cameras which can each provide a respective second video stream; and identifying, based on the first application program and/or based on the first analytics data, at least one second application program that can be fed with at least one second video stream to obtain second analytics data.

20 Claims, 5 Drawing Sheets

(56) References Cited

U.S. PATENT DOCUMENTS

2022/0207971 A1 6/2022 Normann et al.
2022/0277217 A1 9/2022 Francis et al.

FOREIGN PATENT DOCUMENTS

KR 20210065520 A 6/2021
WO 2011136418 A1 11/2011

* cited by examiner

COMPUTER-IMPLEMENTED METHOD, NON-TRANSITORY COMPUTER READABLE STORAGE MEDIUM STORING A COMPUTER PROGRAM, AND SYSTEM FOR VIDEO SURVEILLANCE

CROSS-REFERENCE TO RELATED APPLICATION

This application claims the benefit under 35 U.S.C. § 119(a)-(d) of United Kingdom Patent Application No. 2214928.0, filed on Oct. 10, 2022 and titled "COMPUTER-IMPLEMENTED METHOD, COMPUTER PROGRAM, STORAGE MEDIUM AND SYSTEM FOR VIDEO SURVEILLANCE". The above cited patent application is incorporated herein by reference in its entirety.

FIELD OF THE DISCLOSURE

The present disclosure relates to a computer-implemented method of video surveillance. The present disclosure particularly relates to optimising the use of computer resources that are needed for running analytics application programs. The present disclosure also particularly relates to analytics application programs fed by video streams and running computer vision algorithms.

BACKGROUND

A video management system (VMS) typically receives video data from a plurality of surveillance cameras. The video management system may store the data in a recording server and carry out image processing or analytics, and transmit the video data to a client device (or client apparatus) which may be a mobile device or an operator console including a display where it is viewed by an operator. The video management system may also carry out control relating to the storage and deletion of the video data.

The video management system may also receive commands from the user, from the client device (or operator client). The commands may include commands to remotely control video cameras connected to the video management system such as pan-tilt-zoom (PTZ) video cameras. The commands may also include commands to the video management system which control which data is sent to the client device for display. For example, the operator can control which video cameras' data is sent from the video management system to the display so that the operator can select which video cameras to view data from.

The operator's display may display only data from one video camera at any one time. However, video data from multiple cameras may be displayed simultaneously in multiple windows of an interface (e.g. in multiple panes or child windows inside a parent window), with video from a selected camera preferably displayed in a relatively larger view than the other cameras. Accordingly, the client device can receive one stream of video data or multiple streams.

Video surveillance is often carried out in real time, with an operator tracking objects and/or monitoring events of interest as they happen. Such tracking and monitoring may however be fully or partially automated. The tracking and/or monitoring may fully or partially be carried out by analytics software running, for example, in the video cameras, in an analytics server and/or in the client apparatus.

Such analytics software may be fed with video streams and/or data from various devices (e.g. sensors) which are part of the video surveillance system. The analytics software may comprise several application programs associated with respective video cameras and/or devices (e.g. sensors) of the surveillance system.

Such a system may require a large amount of computational power to run various analytics application programs and it may in many cases not be possible, or even not be desirable, to run all of these programs in parallel. Some applications programs may also require analytics results obtained by other application programs, thus may need to wait for those results to be generated beforehand.

For instance, assume a first scenario in which a first application program is configured to detect an event of interest such as a fire breaking out in an office building and in which a second application program is configured to count people leaving the building after they have been alerted of the event by a smoke alarm. While the number of people in the building is normally monitored through an access system requiring employees to swipe an identification badge when they enter and leave the building, there is a need to deactivate the access system in the event of a fire to facilitate evacuation. It thus become important to count people leaving to ensure that no one remains trapped in the building. In such a scenario, there is no need to run the application program for counting people leaving the building prior to detecting the event of interest. Thus, computational resources may be kept available for other application programs. However, operating the surveillance system in this way creates a risk that the second application program is not started at all or not started in time to reliably count the people leaving the building.

Assume a second scenario wherein an application program is configured to track a movable asset and/or an object of interest in a building, such as an expensive medical device through different parts of an hospital. In such a scenario, each video camera of the video surveillance system in the hospital may run an instance of the same application program configured to detect and track the medical device as it leaves/enters the different parts of the hospital. However, in this example again, it is not advantageous to run an instance of the same application program in each and every video camera of the video surveillance system at the same time, as this would require large computational resources. Additionally, if it takes too long to launch and/or activate the application programs on a relevant video camera, sight of the movable asset and/or an object might be lost.

Assume a third scenario, which is a police investigation, wherein a first application program is configured to detect a particular license plate in a first video stream and wherein a second application program is configured to search a person with a red coat in a second video stream upon detection of that license plate. In this scenario, it might not be useful to search for any persons with a red coat at any time as this could potentially lead to a large number of false positive results, i.e. persons with a red coat which are unrelated to that license plate. Furthermore, in this scenario, it is also not advantageous to run the second application program in each and every video camera of the video surveillance system upon detection of that license plate as this would require large computational resources.

In the above scenarios, there is also a risk of human error when a second application program or second instance of the same application program is launched and/or activated by an operator. For instance, the operator may not launch and/or activate a relevant application program or not launch and/or activate it on a relevant processing system (e.g. on a relevant video camera having embedded analytics capabilities). Operators may further be unfamiliar with the physical area under surveillance and its distances, e.g. operators in a remote surveillance centre. Additionally, when such a launch and/or activation depends on a human operator, there is also a need to train several operators so the surveillance system can run at all times if one of the operators is on leave. These issues become even more complicated as the number of video cameras or surveillance devices (e.g. sensors) increase in the physical area under surveillance. In some cases, an operator may only be watching a limited number of video streams on a display, e.g. eight or nine video streams, while the number of video cameras in the physical area can exceed several tens of video cameras and in some cases even more than a thousand video cameras. The time required for the search will depend, in particular, on the operator's knowledge of the list, e.g. a less experienced operator will probably need more time to find the relevant video cameras. By the time the operator finds and selects one or more video cameras providing video streams of monitored zones which neighbour a monitored zone where the moving object or event (or activity) of interest was first detected, and launch and/or activate a relevant analytics application program, the object or event may have already moved beyond these neighbouring zones such that the operator loses track of it. The issue is aggravated by the time taken to load video streams and/or application programs. Moreover, if the operator loses track of the object or event e.g. when monitoring a large crowd of people and several alternative routes can be taken by the object or event, it is almost impossible to relocate it when having to check individual camera streams from different locations where the object or event could potentially have passed through at different times. In summary, the operator may lose valuable time searching and loading relevant video streams and/or application programs while being without sight of the object or event during all this time, and may ultimately lose track of the object or event.

Running the surveillance system in this way is thus time-consuming, expensive, and difficult.

It is also known to find relevant video cameras based on a Euclidean distance, i.e. by ranking the video cameras based on a radius from the video camera with which an operator observes an incident. However, such a solution does not consider reachability by an object (such as a human person or a car) causing the incident as it will include all video cameras which are within a predetermined radius, including video cameras monitoring zones of a physical area the object cannot access. For instance, two video cameras located on and looking at opposite sides of a motorway would appear to be close based on a Euclidean distance but would not be both able to capture the same car one after the other. Thus, one of the two video cameras is not relevant for further observing the car after it leaves the field of view of the video camera which captured it in the first place.

To solve the issue of identifying relevant video cameras, a solution has been proposed in document US2022207971A1 that relies on a knowledge graph representing video surveillance cameras and monitored zones which can be queried, in order to automatically identify one or more relevant video camera(s) which can show an object and/or event of interest moving across monitored zones. However, the proposed solution does not address the issue of optimising the use of computer resources for running analytics application programs.

Thus, there is a need to optimise the current methods of surveillance and corresponding systems by limiting the amount of computational and human resources they require for operating, and a need to provide methods and systems which generate more relevant and accurate surveillance results.

BRIEF SUMMARY

The present disclosure aims to address at least some of the above-mentioned issues.

To this aim, the present disclosure provides, in particular, a computer-implemented method of surveillance (preferably of video surveillance) comprising the steps of querying a knowledge graph representing a plurality of surveillance devices and/or sensors (such as video cameras) as ontology entities connected by edges, in order to identify, based on a first surveillance device and/or sensor (e.g. a first video camera) providing a first data stream (e.g. a first video stream) that can be fed to at least one first application program to obtain first analytics data, one or more second surveillance devices and/or sensors (e.g. second video cameras) which can each provide a respective second data stream (e.g. a respective second video stream), and identifying, based on the first application program and/or based on the first analytics data, at least one second application program that can be fed with at least one second data stream (e.g. one second video stream) to obtain second analytics data.

The present disclosure is particularly applicable in the case of application programs fed with video streams and running computer vision algorithms, in order to provide analytics data in the form of metadata.

In particular, the present disclosure relates to a computer-implemented method as specified above.

Optionally, in the method, the first application program performs object and/or event detection in the first video stream to detect an object and/or an event of interest.

Optionally, in the method, the first analytics data indicates a kind of object and/or event that has been detected in the first video stream.

Optionally, the method further comprises the step of launching and/or activating the at least one second application program based on the first analytics data, the first analytics data indicating that the object and/or event has disappeared or is about to disappear from the first video stream.

Optionally, in the method, querying the knowledge graph based on the first video camera results in identifying a plurality of the said one or more second video cameras, the method further comprising the step of launching and/or activating only some of the video cameras amongst the second video cameras and/or feeding only some of their respective second video streams to respective second application programs, based on the first application program and/or based on the first analytics data.

Optionally, in the method, the first application program performs object and/or event detection in the first video stream to detect an object and/or an event of interest, wherein activating only some of the video cameras amongst the second video cameras and/or feeding only some of their respective second video streams to respective second application programs comprises identifying one or more video cameras, different from the one or more first video cameras, whose field(s) of view can be reached by the object and/or event from the field(s) of view of the said one or more first video cameras within a first predetermined time.

Optionally, in the method, identifying the at least one second application program is based on the first analytics data.

Optionally, the method further comprises launching and/or activating, in anticipation of a potential appearance of the object and/or event in the second video stream, the at least one second application program based on the first analytics data, the first analytics data indicating that the object and/or event has disappeared or is about to disappear from the first video stream.

Optionally, in the method, the first and second application programs are different instances of the same software program.

Optionally, in the method, the first and second application programs are different software programs.

Optionally, in the method, at least one of the first and second application programs is run in the first or second video camera, respectively.

Optionally, in the method, at least one of the first and second application programs is run in a processing device remote from the first and second video cameras, respectively.

Optionally, in the method, the processing device is a video management system which receives at least some of the video streams from the video cameras and allows a user to remotely control operation of at least one of the one or more video cameras.

Optionally, in the method, the processing device is a cloud-based system which receives a first or second video stream from a video management system which receives at least some of the video streams from the video cameras and allows a user to control operation of at least one of the one or more video cameras.

Optionally, the method further comprises causing at least the first video stream to be displayed in the video management system and causing the second video stream to be displayed in the video management system upon identification of the second video camera.

Optionally, the method further comprises raising an alarm and/or logging on an entry in a log when the object and/or event has left a field of view of the said one first video camera or has disappeared or is about to disappear from the first video stream or has not reached a field of view of a second video camera or has not appeared in a second video stream of a second video camera, within a second predetermined time equal to or longer than the first predetermined time.

The present disclosure also relates to a non-transitory computer readable storage medium storing a program for causing a computer to execute a computer-implemented method of video surveillance comprising the steps of: querying a knowledge graph representing a plurality of video cameras as ontology entities connected by edges, in order to identify, based on a first video camera providing a first video stream that can be fed to at least one first application program to obtain first analytics data, one or more second video cameras which can each provide a respective second video stream; and identifying, based on the first application program and/or based on the first analytics data, at least one second application program that can be fed with at least one second video stream to obtain second analytics data.

Optionally, the program stored in the non-transitory computer readable storage medium may cause a computer to execute a computer-implemented method of video surveillance as defined in any one of the above-mentioned alternatives.

The present disclosure further relates to a video surveillance system configured to carry out a method according to any one of the above-mentioned alternatives, the system comprising the said plurality of video cameras comprising the said first video camera and the said one or more second video cameras, wherein the said first video camera comprises means for performing the step of querying the knowledge graph and wherein the said one or more second video cameras comprise(s) means for performing the step of identifying the said at least one second application program based on information received from the said first video camera, the information received identifying the said first application program and/or comprising the said first analytics data.

Optionally, in the video surveillance system, the first application program is configured to perform object and/or event detection in the first video stream to detect an object and/or an event of interest.

BRIEF DESCRIPTION OF THE DRAWINGS

Embodiments of the present disclosure will now be described, by way of example only, with reference to the accompanying drawings in which.

DETAILED DESCRIPTION

Figure 1:
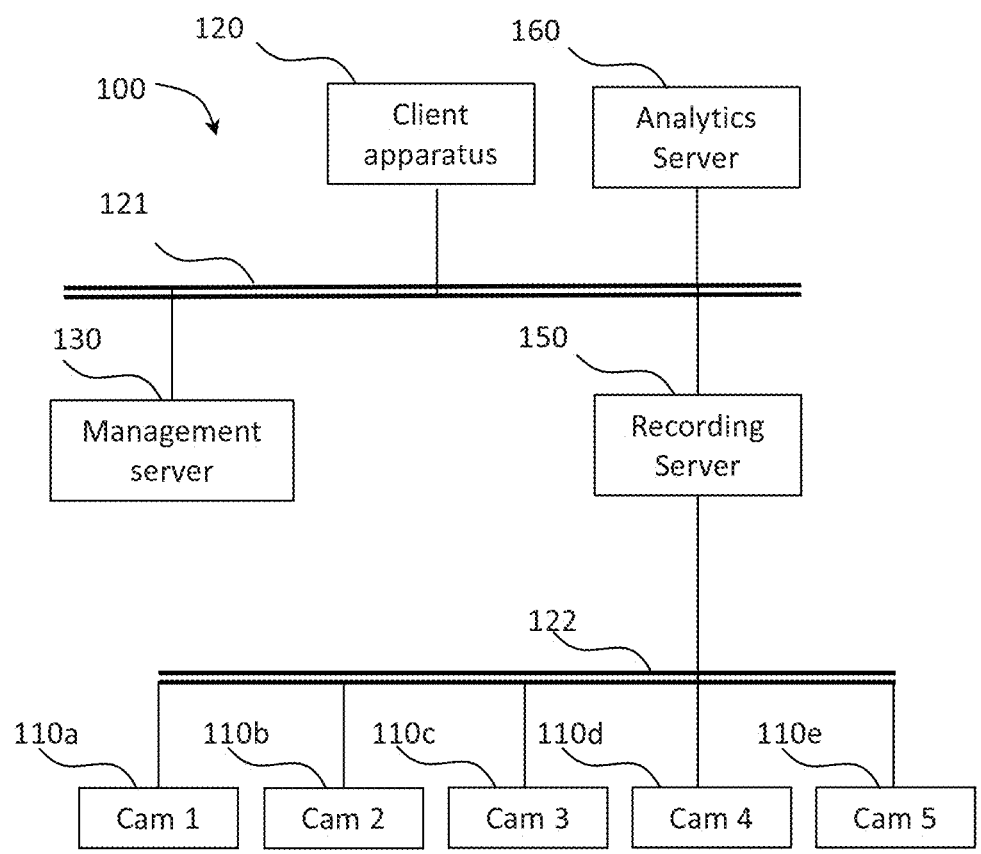
FIG. 1 illustrates an example of a video surveillance system implementing the present disclosure.

FIG. 1 shows an example of a video surveillance system 100 in which embodiments of the present disclosure can be implemented. The system 100 comprises a management server 130, a recording server 150 and an analytics server 160. Further servers may also be included, such as further recording servers, archive servers, indexing servers or analytics servers. For example, an archiving server (not illustrated) may be provided for archiving older data stored in the recording server 150 which does not need to be immediately accessible from the recording server 150, but which it is not desired to be deleted permanently. A fail-over recording server (not illustrated) may be provided in case a main recording server fails. Also, a mobile server (not illustrated) may be provided to allow access to the surveillance/monitoring system from mobile devices, such as a mobile phone hosting a mobile client or a laptop accessing the system from a browser using a web client. A dedicated analytics server can also run analytics software for image analysis, for example motion or object detection, facial recognition, and/or event detection (detection of activity). In the present disclosure, analytics application programs may run on such a dedicated analytics server 160, which can be cloud-based such as in document EP4002853A1 (whose content is hereby incorporated by reference). Additionally and/or alternatively analytics application programs may run "on premises", e.g. in surveillance devices (such as "on edge" when running in the video cameras in the surveillance area which can, for example, run an operating system allowing an administrator and/or superuser to install analytics programs suitable for monitoring the area). The analytics application programs may also run in a video management system (VMS), which can be a management software installed on a client apparatus (or operator apparatus or operator client). The present disclosure is not limited to any particular location of the analytics application programs.

A plurality of video surveillance cameras 110a-110e (five video cameras in this particular example) send video data (e.g. live video streams) to the recording server 150. An operator client 120 provides an interface via which an operator can view live video streams from the video cameras 110a-110e, or recorded video data from the recording server 150. The video cameras 110a-110e capture image data and send this to the recording server 150 as a plurality of video streams. The recording server 150 stores the video streams captured by the video cameras 110a-110e.

According to a preferred embodiment of the present disclosure, some, or none of the fields of view of the video cameras overlap, thus allowing to monitor a larger portion of the physical area under surveillance. Since the present disclosure allows to optimise the current methods of surveillance and corresponding systems by limiting the amount of computational and human resources they require for operating, efficient tracking and/or monitoring of an object and/or event may be achieved with less surveillance sensors (e.g. video cameras). The video cameras may thus be put further away from each other with little or no overlap between their fields of view, therefore allowing to optimise the number of video cameras required.

The management server 130 includes management software for managing information regarding the configuration of the surveillance/monitoring system 100 such as conditions for alarms, details of attached surveillance devices (hardware), which data streams are recorded in which recording server, etc. The management server 130 also manages user information such as operator permissions. When an operator client 120 is connected to the system, or a user logs in, the management server 130 determines if the user is authorised to view video data. The management server 130 also initiates an initialisation or set-up procedure during which the management server 130 sends configuration data to the operator client 120. The configuration data defines the video cameras in the system, and which recording server (if there are multiple recording servers) each camera is connected to. The operator client 120 then stores the configuration data in a cache. The configuration data comprises the information necessary for the operator client 120 to identify cameras and obtain data from cameras and/or recording servers.

The operator client 120 is provided for use by an operator (such as a security guard or other user) in order to monitor or review the outputs of the video cameras 110a-110e. The operator client 120 may be a fixed console or could be a mobile device connected to the video management system via a network. The operator client 120 includes a display which can display an interface for interacting with the management software on the management server 130. The operator client 120 can request video data streams from one or more of the video cameras 110a-110e to view video streams in real time, or the operator client 120 can request recorded video data stored in the recording server 150. According to a preferred embodiment of the present disclosure, the video being captured by one of the video cameras as a selected video stream is displayed in a main window, with video streams captured by other video cameras being displayed in smaller windows. In this case, multiple video streams are sent to the operator client 120. In the case of a system with a large number of cameras, even a large display may not be able to show the video streams from all of the video cameras, only a selection. Alternatively, the operator client 120 may be arranged to show the video stream being captured by only one of the video cameras 110a-110e as a selected video stream on its display. In this case, only one video stream is sent to the operator client 120, this being the stream from the selected camera.

The operator client may also be connected with an incident response system that can receive commands from the operator to remotely close doors, set or change access control rights, prevent, or allow access to certain zones of the physical area, set traffic lights, trigger an alarm, or control any devices configured to be remotely controlled via the incident response system. Note that the commands can be security related, emergency related or operations related. The operator may also speak via a loudspeaker embedded in the video camera.

The operator client 120 is configured to communicate via a first network/bus 121 with the management server 130 and the recording server 150 and the video cameras 110a, 110b, 110c. The recording server 150 communicates with the video cameras 110a, 110b, 110c via a second network/bus 122. The recording server 150 is configured so as to stream video streams from the video cameras 110a-110e to the operator client 120.

The video surveillance system of FIG. 1 is an example of a system in which the present disclosure can be implemented. However, other architectures are possible. For example, the system of FIG. 1 is a system partly running on premises and partly running in the cloud, but the present disclosure can also be implemented in a cloud-based system. In a cloud-based system, the video cameras stream data to the cloud, and at least the recording server 150 is in the cloud. Additionally, video analytics may be carried out in the cloud. The client apparatus requests the video data to be viewed by the user from the cloud. The system may also be configured as a hybrid system where, for instance, the data is archived on a cloud-based archive server after having been recorded on an on-premises recording server. Alternatively, an on-premises server may buffer the video data before moving it to a cloud-based recording server.

Figure 2:
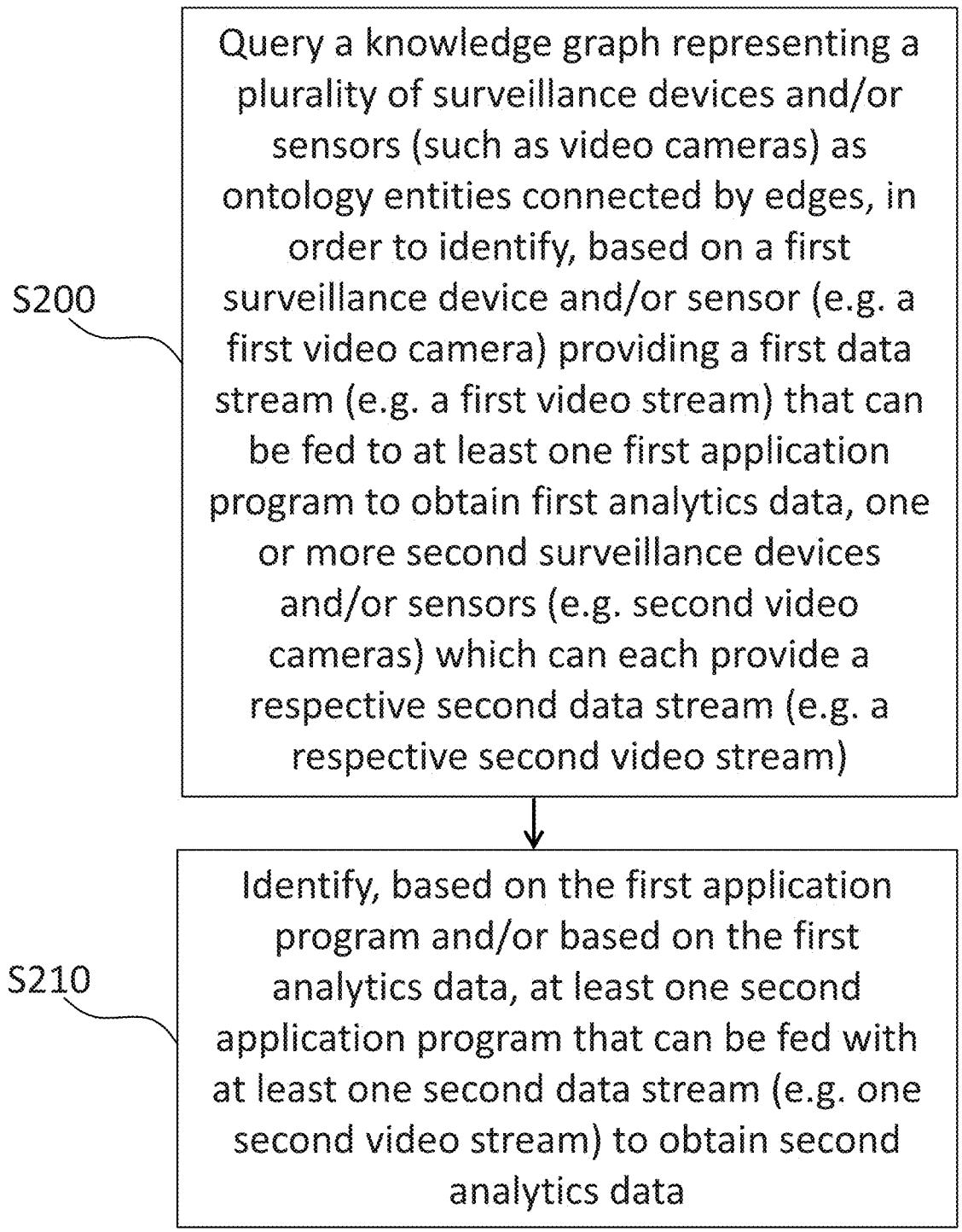
FIG. 2 is a flowchart illustrating the essential steps of the computer-implemented method of video surveillance according to the present disclosure.

FIG. 2 is a flowchart illustrating a computer-implemented method according to the present disclosure, which comprises two essential steps. In a first step S200, the computer will query a knowledge graph representing a plurality of surveillance devices and/or sensors (such as video cameras) as ontology entities connected by edges, in order to identify, based on a first surveillance device and/or sensor (e.g. a first video camera) providing a first data stream (e.g. a first video stream) that can be fed to at least one first application program to obtain first analytics data, one or more second surveillance devices and/or sensors (e.g. second video cameras) which can each provide a respective second data stream (e.g. a respective second video stream).

Within the context of the present disclosure, the term "surveillance devices and/or sensors" should be understood as comprising devices for generating monitoring signals and/or data. Typical surveillance devices and/or sensors include video cameras, cameras, audio recording equipment, or the like, traditional measurement or sensing devices, such as sensors for biological, chemical, or physical quantities/parameters, electrical, magnetic or optical sensors, temperature or wind sensors, light detecting sensors, motion detecting sensors such as passive infrared (PIR) sensors, sensors which use microwave or ultrasonic pulses, or vibration sensors, biometric sensors or systems, access control and alarm equipment or systems, door access control equipment or systems, and production process parameter sensors. The present disclosure is not limited to any particular types of surveillance devices and/or sensors but is particularly applicable to video cameras. Preferably, the surveillance devices comprise a combination of video cameras and other devices such as access control and alarm equipment or systems or door access control equipment or systems. The present disclosure may be used to track valuable movable assets, such as pieces of equipment in an hospital or in a brewery.

Note that the surveillance devices and/or sensors do not need to be connected or to communicate with one another and can be connected to the recording server 150 by ethernet cables of via a wireless connection, for instance. However, in some embodiments of the present disclosure, the surveillance devices and/or sensors may be interconnected so as to send, receive and/or exchange analytics data. For instance, a first surveillance device and/or sensor (e.g. a first video camera) may generate first analytics data with a first application program, then send such data to a second surveillance device and/or sensor (e.g. a second video camera) which may, in turn, use the data to launch and/or activate a second application program.

Alternatively, the surveillance devices and/or sensors may indirectly be connected to the video surveillance system or recording server through one or more parallel systems, provided the surveillance devices and/or sensors are visible and/or controllable through the said one or more parallel systems.

The knowledge graph reflects which zones are reachable by an object and/or event of interest in the physical area under surveillance. By way of example, such a knowledge graph is illustrated in FIGS. 4A-4D, which will be described below. Within the context of the present disclosure, the term "monitored zone" should be understood as a part of the physical area that is monitored, e.g. observed by a video camera, controlled by an alarm or any other surveillance device. Accordingly, a monitored zone may correspond to the field of view of a video camera, though not necessarily.

Although the present disclosure particularly relates to the field of video surveillance, other typical purposes for monitoring video streams may be documentation, medical observation, building management, production, traffic control and/or process control.

The signals, data streams and analytics data generated by the surveillance devices and/or sensors can be segmented into data segments of manageable sizes in order to be stored on recording servers. The signals, data streams and analytics data can then be retrieved from the recording servers for live or playback streaming for viewing and/or analysis at a client side, preferably using an indexing server.

The second step S210 of the method comprises, identifying, based on the first application program and/or based on the first analytics data, at least one second application program that can be fed with at least one second data stream (e.g. one second video stream) to obtain second analytics data.

Within the context of the present disclosure, the second step S210 may be performed within the first surveillance device and/or sensor (e.g. first video camera), but may also be performed by a second surveillance device and/or sensor, in particular by the second surveillance device and/or sensor on which the second application program is intended to run. Alternatively, the second step S210 may also be performed by the VMS in the client apparatus 120.

It will be appreciated that the identifying step S210 can be carried out on the basis of a known relationship between the content of the first analytics data and a second application program to be launched and/or activated. For example, if the first analytics data indicates that a particular license plate is present in a first video stream provided by a first video camera, this information and/or result may be transmitted to one or more second video cameras and/or VMS, and one of them may then identify which second application program to run and where to run it. For example, a second camera may be configured to launch and/or activate a second application program to track and/or detect a person having a red coat based on the information that the particular license plate has been detected in the first video stream.

The present disclosure may advantageously be used in a live context. For instance, assume that the exits of the room where the Mona Lisa is located include video cameras with embedded analytics, e.g. each video camera having the same first application program to specifically detect that painting. If one of these camera applications detects the Mona Lisa, it will query the knowledge graph, and deploy the Mona Lisa detection application program on other relevant cameras at the museum, e.g. at the exits of the museum. Thus, advantageously, the video cameras in the museum will only normally run applications to specifically detect nearby paintings or pieces of art.

The said relationship may be locally stored, centrally stored, and/or stored in a distributed manner depending on the use case. For instance, each video camera in the surveillance system may comprise storage means having stored thereon the said relationship, for instance as a table, so that each video camera may refer to the relationship as need be. The said relationship may also be centrally stored. For instance, each video camera in the surveillance system may access storage means in the VMS to obtain the said relationship. In this manner, the relationship may be updated more easily. The said relationship may also be distributed and/or tailored to particular devices, such that only the information relevant to a particular surveillance device is stored in and/or accessible to that device.

Alternatively and/or additionally, the identifying step S210 can be carried out on the basis of a known relationship between a first video camera and a second application program. For instance, if a first video camera is configured to run a motion detection program (as a first application program) in a corridor near the room of a patient in an hospital, a facial recognition program (as a second application program) may then be fed with one or more video streams from one or more respective second video cameras, for instance from a video camera at an exit of the hospital building, to detect whether a particular patient under surveillance has left the building. It will be appreciated that the same second application program may receive video streams from one or more second video cameras. For example, referring to the above-mentioned example of a fire breaking out in an office building, it might be advantageous to feed the same application program with video streams from different second video cameras so as to count a total number of people leaving the building in the same instance of the second application program. Alternatively, different second application programs (e.g. a second application program for counting people and a second application program for counting vehicles) might receive a video stream originating from the same second video camera. According to another alternative, different instances of the same application program may each receive a second video stream from a respective second video camera (e.g. two video cameras at the exit of an hospital building may feed their own second application program for facial recognition). For instance, assume a care home with patients with dementia. In that scenario, video cameras at the exits of the care home (or the VMS) perform facial recognition for the patients known to walk about or wander. If a face is recognized, an alarm is raised at the VMS, and at the same time, the facial recognition application program to detect that patient is launched at the (next level) parking lot/the street etc., to give the operator information about which way the patient is going. In this way, only the entrance camera needs to run (and be capable of running) multiple application programs at the same time.

According to the present disclosure, the relationship may thus associate a first application program with a second application program or a first video camera with a second application program. Alternatively, the relationship may associate a first video camera and a first application program on the one hand with a second application program on the other hand. For instance, the relationship may indicate that if first analytics data comprises a particular license plate, the second application program may be launched and/or activated only when that first analytics data originates from a particular first video camera. It is thus possible to run one or more second applications programs in one or more respective second video cameras, in the VMS and/or in the cloud depending on which first video camera is used and the content of the first analytics data it generates.

The present disclosure is particularly useful in use cases in which the first application program performs object and/or event detection in the first video stream to detect an object and/or an event of interest.

It will be appreciated that object and/or event detection may be performed at different levels of detail. For instance, object detection may only detect a kind of object (e.g. human beings, vehicles, movable asset etc.) based on its shape and/or appearance. However, object detection may more precisely detect a particular object, for instance a particular movable asset within a building, based on one or more particular features (e.g. a barcode that can be detected by the said first video camera). The present disclosure is not limited to any particular level of detail of object and/or event (or activity) detection.

According to the present disclosure, the first analytics data may indicate that a particular kind of object and/or event has been detected and/or is present in the first video stream and/or in the field of view of the first video camera (knowing that the field of view may correspond to the first video stream, but the first video stream may also correspond to a truncated portion of the field of view of that video camera).

According to the present disclosure, the first analytics data may alternatively and/or additionally indicate that a particular kind of object, a particular object and/or particular event has disappeared and/or is about to disappear from the first video stream and/or in the field of view of the first video camera.

Advantageously, the at least one second application program may be launched and/or activated based on the first analytics data, the first analytics data indicating that the object and/or event has disappeared and/or is about to disappear from the first video stream, as in the above-mentioned example of a fire breaking out in an office building. This launch and/or activation might be performed upon receipt of the said first analytics data in one or more second video cameras, in the VMS or in the cloud, but may also be delayed for a predetermined period, as need be. For instance, assume an object that can move very quickly between different monitored zones. In such case, it may be necessary to perform the said launch and/or activation right after the receipt of the said first analytics data. Conversely, in the case of a very slow object being monitored (or when distances between monitored zones are relatively long), it may be possible to perform the said launch and/or activation after a predetermined period, to keep computational resources available for other potential application programs during that period.

According to the present disclosure, the step S200 may result in identifying a plurality of the said one or more second video cameras. In that case, the method may comprise the step of launching and/or activating only some of the video cameras amongst the second video cameras and/or feeding only some of their respective second video streams to respective second application programs, based on the first application program and/or based on the first analytics data. For instance, referring to the above-mentioned example of a fire breaking out in an office space, assuming that the first application program has detected the fire, it may only be useful to activate those second video cameras that observe exits of the building (and thus that can be used for counting people leaving the building). Thus, it might be advantageous to disregard second video cameras and their respective second video streams which are located between the first video camera that detected the fire and those second video cameras that observe exits of the building. In this way, the second application program(s) for counting people leaving the building are not fed with irrelevant video streams. Similarly, it can be decided that a display showing relevant video stream to an operator should not be cluttered with irrelevant video streams and should only show the first video stream and the video streams from those second video cameras that observe exits.

More generally speaking, it may be advantageous to cause the VMS to display at least the first video stream and to cause the VMS to display the second video stream(s) from the one or more second video cameras upon identification of the said second video cameras.

The selection of which second video camera(s) to launch and/or activate can thus depend on which first video camera is used and preferably also depend on the content of the first analytics data it generates.

Preferably, the said selection of which second video camera(s) to launch and/or activate can further be based on whether the object and/or event can reach those video cameras within a first predetermined time. For instance, assume a movable asset being moved at an estimated speed of 1 m/s. Once the first video camera detects that the movable assets has left the first video stream and/or the field of view of the first video camera, the method may comprise launching and/or activating one or more second video cameras which are reachable by the object within a first predetermined time (or period) of seconds, i.e. the second video cameras which are or whose fields of view are located at no more than 10 metres from the first video camera. In this regard it may be advantageous to consider distances between the different fields of view of the video cameras rather than actual distances between the physical cameras, as video cameras may be located in close proximity while looking at fields of view which are in fact quite distant. A geometric center or centroid in each of these different fields of view could for instance be used to measure, calculate and/or estimate such distances. However, the skilled person may use any known method to determine or estimate such distances.

According to the present disclosure, it may be necessary or advantageous to launch and/or activate the said at least one second application program based on the first analytics data in anticipation of a potential appearance of a tracked object and/or monitored event in a second video stream. This may be particularly useful in the case where the second application program cannot be launched and/or activated in a short time. For instance, assume that the first analytics data indicates that an object and/or event is about to leave the first video stream and/or field of view of the first video camera. In such case, it is possible to launch and/or activate the said at least one second application program before the object and/or event actually leaves the first video stream and/or field of view of the first video camera, that is, in anticipation of a potential appearance of the object and/or monitored event in the second video stream. For instance, determining whether the object and/or event is about to leave a video stream may comprise determining whether the object and/or event approaches an edge (or border) of the field of view and/or video stream.

According to the present disclosure, the first and second application programs may be different instances of the same software program, but may also be different software programs. The skilled person will appreciate that this particularly depends on the specific use case.

According to the present disclosure, the first and second application programs may run in respective cameras. This may provide the advantage that, for example, the video stream provided by these cameras are quickly fed to the said applications programs, and that the analytics data obtained from these applications programs may be sent concurrently or soon after the video streams are sent to further devices, such as the client apparatus and/or other video cameras.

However, at least one of the first and second (or further or subsequent) application programs may also be run in a processing device remote from the first and second video cameras, respectively. This may be advantageous for security reasons, for example, since it might be easier to apply security patches and regular updates on software which is run outside of the video cameras. This may also be necessary when the video cameras do not have the hardware capability to run the said software.

According to the present disclosure, such a remote processing device might be a client apparatus running a VMS as described above.

According to another embodiment of the present disclosure, such a remote processing device might be cloud-based, e.g. such as a remote digital devices described in document EP4002853A1. The skilled person will appreciate that the choice of an on premise or cloud-based processing device depends on the specific use case.

When the first and/or second analytics data is sent to and received in the VMS, it might be advantageous to cause the VMS to display such data to an operator. This may allow an operator to follow an evolution of the first and/or second analytics data, for example in the context of an evacuation as described above. The skilled person will appreciate that it might be necessary to convert the analytics data to a human-readable format prior to displaying it.

According to the present disclosure, it might be advantageous to raise an alarm and/or log on an entry in a log when the object and/or event has left a field of view of the said one first video camera or has disappeared or is about to disappear from the first video stream or has not reached a field of view of a second video camera or has not appeared in a second video stream of a second video camera, within a second predetermined time equal to or longer than the first predetermined time. This alarm may draw the attention of an operator to a particular issue in the surveillance area. Moreover, an operator with appropriate access rights may be able to check the said log in order to confirm an issue and/or to perform forensic analysis. The second predetermined time may be equal (or correspond) to the first predetermined time, that is, the alarm will be raised and/or the log entry will be logged on if the object and/or event is not detected again by the second layer or line of video camera(s)/stream(s)/application program(s) after it has left the first video stream and/or field of view of the first video camera, and within an estimated time for the object and/or event to reach the second layer.

The skilled person will appreciate that, within the context of the present disclosure, the terms "first" and "second" in "first video camera"/"second video camera(s)" and in "first analytics data"/"second analytics data", and in "first application program"/"second application program" are relative terms in the sense that the identity and/or analytics data of a video camera, or identity of a first application program fed with the video stream of that camera is used to launch and/or activate a second video camera, obtain second analytics data, and/or launch and/or activate a second application program. Accordingly, a second video camera may correspond to a first video camera from the perspective of a third video camera, and the third video camera may correspond to a second video camera from the perspective of a second video camera. Thus, the terms "first" and "second" do not correspond to absolute positions of the video cameras in the surveillance area but to a relative order of use of these video cameras and corresponding application programs and relative order of obtention of the analytics data, i.e. which video camera(s), video stream(s), analytics data, and/or program(s) is/are used or obtained before other(s).

For example, within the context of the present disclosure, once an object and/or event of interest has moved from a first video stream provided by a first video camera to a second video stream provided by a second video camera (and/or from the field of view of the first camera to that of the second camera), the original first video camera then becomes a second video camera from the perspective of the original second video camera, and the original second video camera becomes a first video camera from the perspective of the original first camera.

The skilled person will appreciate that the surveillance system may thus comprise a large number of surveillance devices and/or sensors such as video cameras which can be used in a cascade, e.g. the analytics data obtained from a third video camera and/or the identity of a third video camera may be used to launch and/or activate a fourth application program embedded in a fourth video camera or running in a cloud-based system, which fourth application program can be fed with a fourth video stream from that fourth video camera.

According to the present disclosure, the method may comprise launching and/or activating at least one third application program based on first and/or second analytics data, the second analytics data indicating that an object and/or event that has disappeared or is about to disappear from a first video stream has not appeared in any one of the second video streams or has not appeared in any one of those second video streams corresponding to the second video cameras that have been activated or has not appeared in any one of those second video streams corresponding to the video streams that have been fed to respective second application programs. For example, the third video camera(s), third video stream(s) and third application program(s) correspond to a third layer or line of video camera(s)/stream(s)/application program(s) that are to be used after the first and second layers or lines or camera(s)/stream(s)/application program(s).

According to the present disclosure, the method may comprise launching and/or activating, in anticipation of a potential appearance of an object and/or event in a third video stream, at least one third application program based on the first analytics data and on an estimated load time required for loading the third application program, the first analytics data indicating that the object and/or event has disappeared or is about to disappear from the first video stream. For instance, assume that an object and/or event of interest has left the first video stream and/or field of view of the first video camera, it is possible that the object and/or event of interest will not be caught by the second layer or line of video camera(s)/stream(s)/application program(s) because the object and/or event moves too quickly in the surveillance area and/or because the second application program cannot be launched and/or activated in time to capture the said object and/or event. In such a scenario, it is thus advantageous to launch and/or activate, in anticipation of a potential appearance of the object and/or event in the third video stream, the at least one third application program based on the first analytics data and on an estimated load time required for loading the third application program, the first analytics data indicating that the object and/or event has disappeared or is about to disappear from the first video stream. Determining whether the object and/or event is about to leave a video stream may here again comprise determining whether the object and/or event approaches an edge of a field of view and/or video stream.

According to the present disclosure, launching and/or activating the at least one third application program may be carried out when the object and/or event that has disappeared, or is about to disappear from the first video stream, has not appeared in any one of the second video streams, or has not appeared in any one of those second video streams corresponding to the second video cameras that have been activated, or has not appeared in any one of those second video streams corresponding to the video streams that have been fed to respective second application programs, within a third predetermined time equal to or longer than the second predetermined time.

Thus, according to the present disclosure, a first predetermined time may be used to determine which second video camera(s) may be activated to track an object and/or monitor an event, a second predetermined time may be used to raise an alarm and/or log on an entry in a log if the object and/or event has not appeared again, and a third predetermined time may be used to launch and/or activate at least one third application program. It will be appreciated that these three predetermined time are preferably such that the first predetermined time is shorter than the second predetermined time, and that the second predetermined time is shorter than the third predetermined time. However, the present disclosure extends to cases where the first and second and/or second and third predetermined times are equal, depending on the use case.

The first video camera will then be used as a starting point to navigate around the knowledge graph and identify, in the step S200, a second (and/or any further and/or any subsequent) video cameras monitoring zones which are relevant based on the (selected) first video camera.

Preferably, the identified video camera(s) is or are the video cameras which are topologically closest to the first video camera. Within the context of the present disclosure, "topologically closest" means these video cameras which are closest or immediately adjacent in the knowledge graph in all directions starting from the selected first video camera. Note however that the present disclosure is not limited to this identification of the closest neighbouring video camera(s), but that it may be advantageous to identify them.

The process described in steps S200 and S210 can advantageously be repeated multiple times in order to follow the moving object or event of interest in the physical area.

Figure 3:
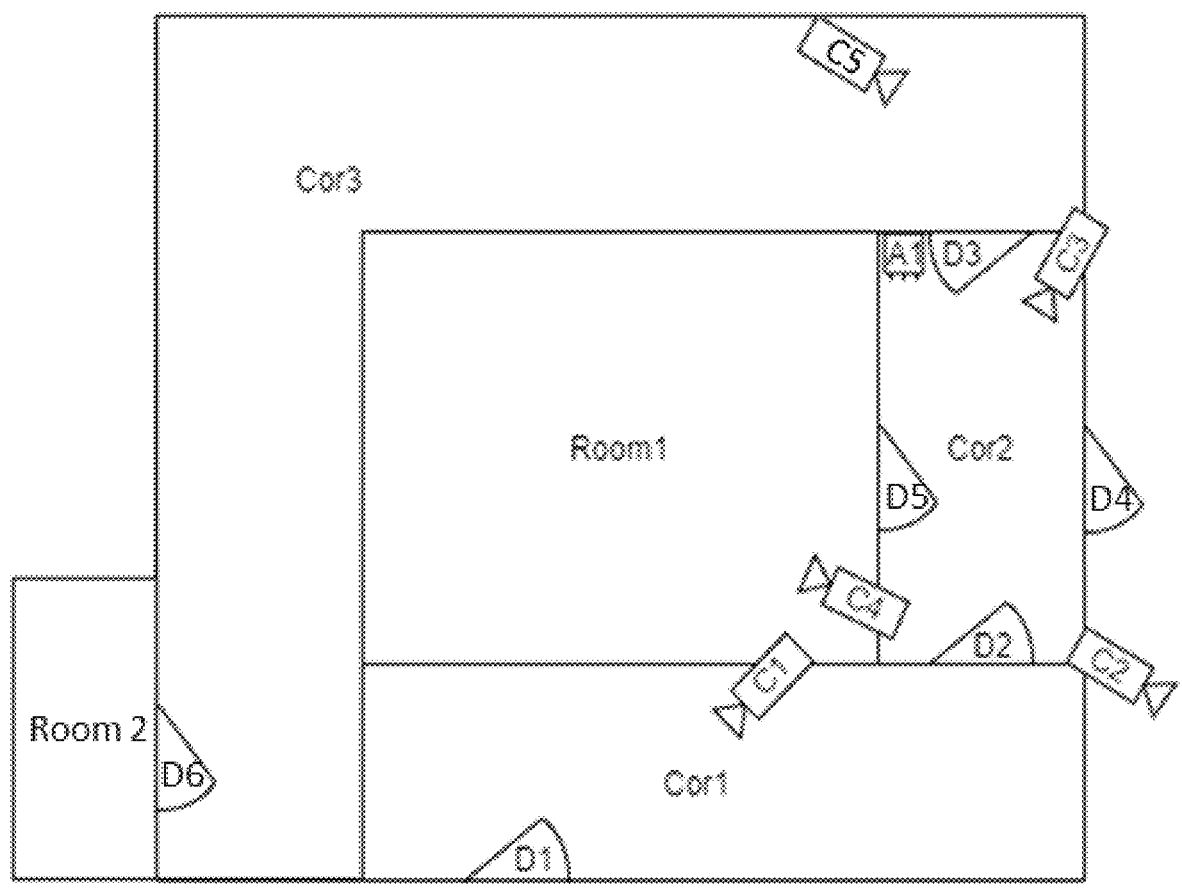
FIG. 3 is an example of a floor plan of a physical area under surveillance showing different surveillance devices monitoring zones of the physical area.

FIG. 3 shows an example of a 2D plan of a ground floor of a building under surveillance. This ground floor comprises three corridors Cor1, Cor2, Cor3 and two rooms Room1, Room 2, connected by six doors D1, D2, D3, D4, D5 and D6 and five cameras C1, C2, C3, C4, C5 (corresponding respectively to the video cameras 110a-110e) belonging to and monitoring different zones of the physical area. As it can be seen, the door D1 gives access to the corridor Cor1 from an outside of the building, the corridor Cor1 is connected to the corridor Cor2 via the door D2, the corridor Cor2 is connected to the corridor Cor3 via the door D3, to the room Room1 via the door D5 and to the outside of the building via the door D4. The corridor Cor3 is connected to a room Room2 via the door D6.

The video camera C1 monitors the corridor Cor1 and the openings and closures of the door D1, the video camera C3 monitors the corridor Cor2 and the openings and closures of the doors D2, D4 and D5, the video camera C4 monitors the room Room1 and the openings and closures of the door D5, and the video camera C5 monitors a part of the corridor Cor3 and the door D3. Note that camera C2 is located outside the building and monitors an exterior of the building (e.g. a street) which is connected to the ground floor. Furthermore, an access control reader A1, which is another surveillance device (and also a sensor capable of detecting ID badges), is connected to the door D3 to monitor openings and closures of the door D3. Note also that the corridor Cor3 is not fully monitored, as a left part of the corridor Cor3 falls outside of the field of view of the video camera C5. Moreover, the room Room2 and door D6 are also not directly monitored. Nevertheless, an object and/or event going to or coming from the room Room2 will be picked up by the camera C5 when it reaches its field of view. It can be seen that a moving object and/or event of interest could not directly go, for instance, from the door D1 to the room Room1 without passing through the three doors D1, D2, D5 and two corridors Cor1 and Cor2. Similarly, such an object and/or event could not directly go, for instance, from the door D4 to the Room2 without passing through the corridors Cor2 and Cor3 and the doors D3 and D6.

Note that this floor plan is merely an example and that the present disclosure may be extended to broader physical areas. For instance, a plan of a physical area to be kept under surveillance could be obtained by using a map of the physical area and overlaying it with the surveillance devices and/or sensors on the basis of their GPS coordinates, and combining data representing which zones of the physical area the surveillance devices and/or sensors monitor. For instance, video cameras may be positioned on the basis of their GPS coordinates and respective fields of view determined by known methods (e.g. by using local camera coordinates).

According to the present disclosure, such a plan should then be converted into a knowledge graph, as exemplified with FIGS. 4A to 4D, which show how the video cameras are interconnected. This graph may be supplemented with distances between the cameras and/or their respective fields of view. For instance, FIGS. 4A to 4D indicate that there is a walking distance of 10 metres between the cameras C1-C3, C2-C1, C3-C4, C3-C5 and C3-C4, whereas the walking distance between the cameras C1-C3 is 15 metres. These walking distances may be stored as metadata and/or as label on the knowledge graph, as shown in FIGS. 4A-4D.

Note that the present disclosure is not limited to the kind of graph described in FIGS. 4A-4D. For example, a more complex graph, such as the graph in FIG. 4 of document US2022207971A1 (whose content is hereby incorporated by reference) could be used.

The present example of FIGS. 4A-4D relates to tracking a medical device (a movable asset in and out of the building).

Figure 4A:
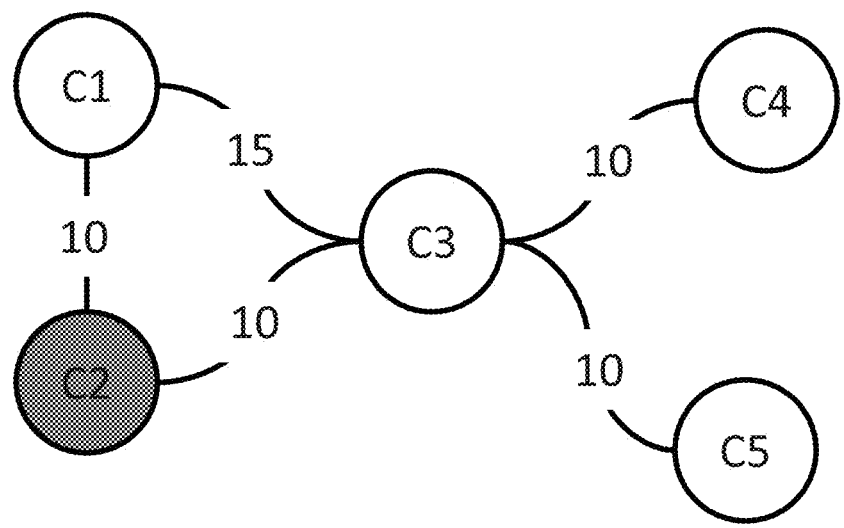
FIGS. 4A to 4D are examples of a knowledge graph representing some of the surveillance devices of the monitored zones of FIG. 3 as ontology entities (or nodes) connected by edges representing physical paths between the monitored zones.

Referring to FIG. 4A, assume that a camera C2 monitors the medical device, and that a first monitoring application program providing first analytics data is only running on that camera, or for that camera in the VMS or in an analytics server, e.g. in a cloud-based system.

Figure 4B:
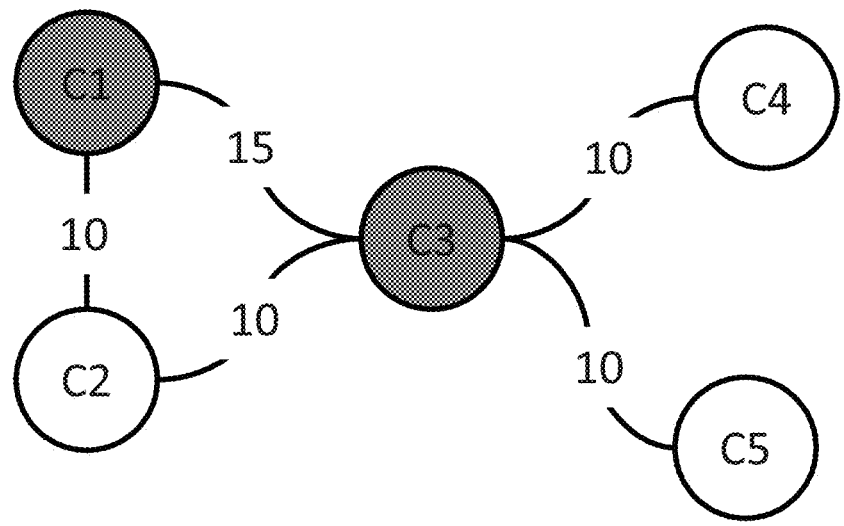

Referring to FIG. 4B, the camera C2 detects that the device is being moved out of its field of view at an estimated or predetermined speed of 1 m/sec. All cameras the device can reach within 10 sec (corresponding to the first predetermined time mentioned above), i.e. cameras C1 and C3, are activated for the same analytics application. In other words, two instances of the first monitoring application program will now be running on the cameras C1 and C3, or for these cameras C1 and C3 in the VMS or in a cloud-based system, as second application programs.

Figure 4C:
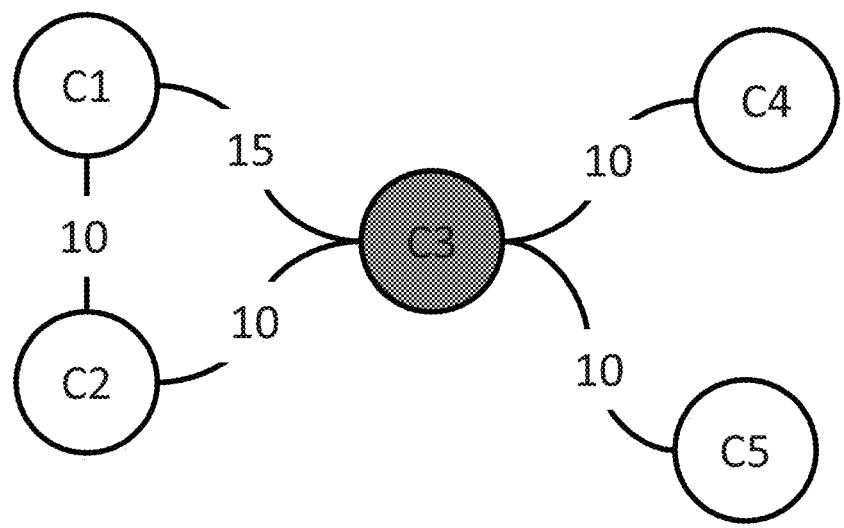

Referring to FIG. 4C, the medical device is again detected by camera C3 within 8 seconds from its departure from the field of view of the camera C2. Since the medical device is detected within a period of 15 seconds (corresponding to the second predetermined time mentioned above), no alarm is raised, or no log entry is made in a monitoring log. In other words, the surveillance system has not lost sight of the medical device.

Assume now that the medical device left the field of view of the camera C2 but does not appear in the fields of view of the cameras C1 and C3 within 15 seconds, an alarm is raised and/or a log entry is made in a log to inform an operator that the surveillance system has lost sight of the medical device. Moreover, the surveillance system may further be configured to launch and/or activate further video cameras, such as the video cameras C4 and C5, if the medical device does not appear in the field of view of the cameras C1 and C3 within 20 seconds (corresponding to the third predetermined time mentioned above).

As mentioned above, the present disclosure is not limited to particular predetermined times. Moreover, the surveillance system may be configured to launch and/or start the video cameras C4 and C5 if the medical device does not appear in the field of view of the cameras C1 and C3 within the third predetermined time mentioned above and launch and/or activate their third application program(s) right away. In that case, if a malfunction prevented detection of the medical device by the second layer or line of cameras, i.e. the video cameras C1 and C3, there is still a chance that the medical device can be picked up by the third line of video cameras, i.e. the video cameras C4 and C5.

Figure 4D:
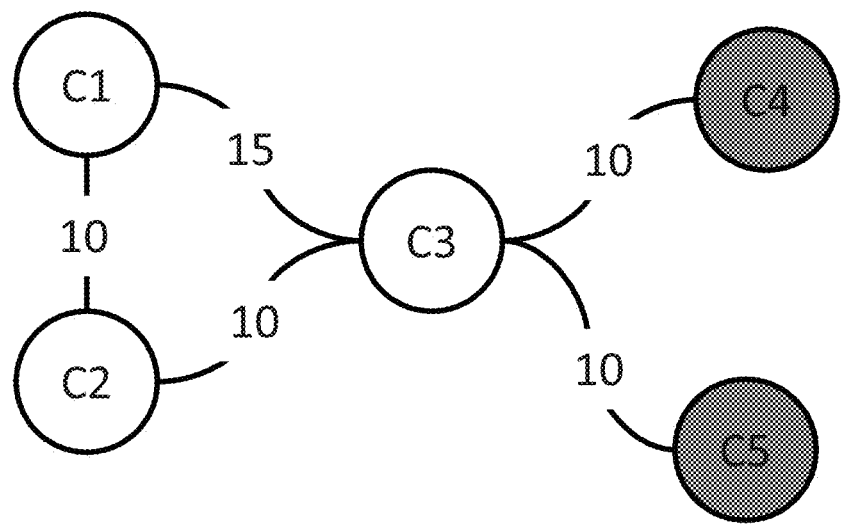

Referring to FIG. 4D, when the medical device leaves the field of view of the camera C3, all cameras the device can reach within 10 sec (corresponding to the first predetermined time mentioned above), i.e. the video cameras C4 and C5, are activated, along with the relevant monitoring application program(s) on that camera, or for that camera in the VMS or in an analytics server, e.g. in a cloud-based system, to provide analytics data.

The processes for monitoring different objects (such as moveable assets) and/or events of interest may advantageously be independent. For example, one camera and its analytics application program(s) can be deactivated for an asset A but still be activated for an asset B, based on the aforementioned relationship between the video cameras and preferably and additionally, the analytics data they provide, on the one hand, and second (and/or further and/or subsequent) application program(s) running on or for second (and/or further and/or subsequent) video cameras on the other hand.

According to a non-illustrated embodiment of the present disclosure, the knowledge graph may be in the form of a directed labelled graph. This indicates, for example, that a movable object and/or event may only move in a certain direction between different video cameras in the knowledge graph and thus in the physical area too. The edges may also be in the form of solid lines or curves (i.e. undirected edges), so long as the computer is configured to determine the meaning of these edges. These undirected edges may also comprise data and/or metadata representing labels and/or properties thereof. The data and/or metadata may here again be represented above, over and/or below the edges, as in the document US2022207971A1.

According to another non-illustrated embodiment of the present disclosure, the knowledge graph may further represent the monitored zones as ontology entities connected by edges representing physical paths between the monitored zones, wherein the video cameras are then connected by edges to the zones they monitor, as in document US2022207971A1.

According to another non-illustrated embodiment of the present disclosure, the knowledge graph may also represent the entirety of the monitored zones but also preferably the non-monitored zones which are on the paths between the monitored zones.

Note that the video cameras may be PTZ cameras configured to rotate so as to monitor the entirety of the monitored zones they belong to.

According to another non-illustrated embodiment of the present disclosure, the monitored zones may include blind spots or dead zones. In such a case, it is advantageous to represent these blind spots or dead zones as non-monitored zones in the knowledge graph, because they also impact the speed at which an object and/or event of interest may move from one video stream (or field of view) to another one.

According to another non-illustrated embodiment of the disclosure, at least some of the edges may be represented as directed edges (unidirectional edges) showing relationships between the monitored zones, non-monitored, surveillance devices and/or sensors and properties thereof.

According to another non-illustrated embodiment of the present disclosure, at least some of the edges may be represented as bidirectional edges (double arrows) comprising data and/or metadata representing labels and/or properties associated with both directions of the said bidirectional edges. The data and/or metadata may be represented above, over and/or below the edges.

According to another non-illustrated embodiment of the present disclosure, at least some of the edges may be represented as edges originating from and pointing to a single ontology entity. These edges may also comprise data and/or metadata representing labels and/or properties thereof. For instance, an edge comprising a label representing a condition for accessing a zone represented by that ontology entity. The data and/or metadata may be represented above, over and/or below the edges.

Note that the ontology entities (or nodes) may also comprise data and/or metadata representing labels and/or properties of the monitored and/or non-monitored zones (if any), such as for instance data and/or metadata representing whether a zone is an indoor zone or outdoor zone. The data and/or metadata may be represented above, over and/or below the ontology entities.

Note that the knowledge graph may be stored in the form of computer-executable code which represents the said ontology entities and edges. This code may for instance be presented in a format such as XML or JSON, or any other suitable format.

According to the present disclosure, it is possible to make or generate the knowledge graph starting from one or more files whose content includes a representation of the area under surveillance (or zones thereof), which is to be populated with the surveillance devices and/or sensors. In such a case, the file(s) representing the area under surveillance (or zones thereof) may be one or more static files which are not to be modified, expect by an administrator and/or superuser, or otherwise by a person with sufficient access rights, for instance, when there is a need to extend the area under surveillance or when the layout of the area under surveillance has changed. An operator having the same access rights or less access rights than the said administrator and/or superuser may then be able to populate the representation of the area under surveillance of the static file(s) by copying their content from storage to a computer memory, where the said content can be supplemented with the said devices and/or sensors. One or more resulting file(s) comprising the area under surveillance with the surveillance devices and/or sensors may then be stored as need be.

According to another embodiment of the present disclosure, one or more dynamic files comprising the said surveillance devices and/or sensors may be stored separately from the said one or more static files, and a computer such as the client apparatus 120 and/or the management server 130 may be configured to combine the content of the static file(s) and dynamic file(s) as need be. The static and dynamic files can thus be edited by different users depending on their access rights.

By using a logical model of the location of the surveillance devices and/or sensors, and how they are related to each other (preferably through rooms, doors, corridors etc.) the most relevant surveillance devices and/or sensors can be suggested to an operator, and/or corresponding application programs can be run on or for these devices and/or sensors.

According to a non-illustrated embodiment of the present disclosure, the knowledge graph may include non-monitored zones of the physical area as ontology entities connected by edges, the said non-monitored zones being part of the said possible path, such as for instance the room Room2 in FIG. 3. In this way, the non-monitored zone(s) can also be considered for suggesting the most relevant surveillance devices and/or sensors to an operator, and/or corresponding application programs can be run on or for these devices and/or sensors.

For instance, assume that the exterior in FIG. 3 is a zone where an object is detected by the camera C2, corresponding to a first video camera providing a first video stream that is fed to a first application program for detecting objects. Querying the knowledge graph according to the present disclosure (as in step S200) will allow to identify two of the said second video cameras, i.e. cameras C1 and C3, which based on the logical model of the area under surveillance are likely to detect the object if it enters the building.

Based on the use case, it is then possible to identify, based on the first application program (e.g. program for detecting objects) and/or based on the first analytics data generated by such program (e.g. metadata indicating the presence of a particular object), at least one second application program that can be fed with the video stream(s) of cameras C1 and/or C3. For instance, the at least one second application program may be a different instance of the first instance program, to continue detecting the object across the building. Alternatively, the at least one second application program may be a program which performs more functions that cannot be provided by the first application program. For instance, the at least one second application program may be a program which performs facial recognition.

Assuming that some cameras (e.g. cameras C1 and C3) were selected because the operator wanted to track a moving object (such as a tracked person) that was first detected by another camera (e.g. camera C2), it is possible to consider whether access control prevents the object from moving to certain monitored zones to identify the video camera(s) that are likely to see the object if it further advances into the building.

For instance, assume that the tracked person has been recognised by the second application program for facial recognition fed with the video stream from the said second video camera C3, and that the recognised person is known not to be authorized to open the door D3 (hence that the access control reader A1 is unlikely to grant them access to the corridor Cor3). This information can be used for querying the knowledge graph and/or filtering the results of the querying so as to identify one or more third (or further or subsequent) video cameras which, based on the logical model of the area under surveillance embedded in the knowledge graph, are likely to see the object (the tracked person) next if it further advances into the building. Knowing that the object is unlikely to be seen by the camera C5 (as it cannot open the door D3), the third video cameras that could see the object next are therefore the cameras C1 and C4. Therefore, in the present example, the first video camera is the camera C2 (corresponding to the so-called first layer or line of cameras), the second video cameras are the cameras C1 and C3 (corresponding to the so-called second layer or line of cameras), and the third video cameras are the cameras C1 and C4 (corresponding to the so-called third layer or line of cameras).

Should a person successfully authenticate themselves with the access control reader A1, the computer may consider such authentication to identify a new layer or line of video camera(s) and in this particular example identify the video camera C5 as a relevant video camera.

According to another example (not illustrated) of the present disclosure, assume that Room1 comprises a smoke alarm instead or in addition to the video camera C4. If a fire breaks out in the Room1 (which fire can be considered as an event of interest), the smoke alarm will go off and send a signal enabling to activate the camera C4 as a first video camera, whose first video stream can be fed to a program for detecting unconscious people in the room Room1 as a first application program. A knowledge graph of the surveillance area can then be queried (as in the step S200) to identify at least one or more second video cameras which, based on the logical model of the area under surveillance embedded in the knowledge graph, are likely to provide a relevant video stream. In the present example, querying the knowledge graph will allow to identify the camera C3 as a relevant video camera. Moreover, knowing which first application program has been activated (i.e. here a program for detecting unconscious people), it is possible to identify (as in the step S210) at least one second application program that is likely to be useful when fed with the second video stream of the second video camera C3. In the present example, one second application program could be a program for placing a virtual tripwire before the door D5 and thus monitor people entering/leaving the room Room1. In the present example, the identifying step S210 can be carried out on the basis of a known relationship between the first application program and second application program to be launched and/or activated.

According to the present disclosure, when a surveillance device or sensor sends a signal enabling to select the first video camera (such as the smoke alarm mentioned above), this surveillance device does not need to be a video camera.

As explained above, the skilled person can optionally choose to limit the maximum number of video cameras that can be identified in the step S200, which can be predetermined and/or based on the number of video cameras identified as a result of the query.

In a case where the querying results in identifying a plurality of the said one or more second (and/or any further and/or any subsequent) video cameras, it may be advantageous to rank them. This ranking can be based on different criteria.

According to a non-illustrated example, the ranking can be made by weighing each edge of the knowledge graph based on a physical distance represented by that edge. These distances can be as explained above.

Alternatively, the ranking can be made by considering a dimension or geometry of each monitored zone. Such a dimension or geometry can be represented as a property of each ontology entity representing a monitored zone. These properties may be represented as in FIG. 4 of document US2022207971A1, in circles or boxes similar to those of the ontology entities. The knowledge graph may further comprise labelled directed edges which link the different cameras, monitored and/or non-monitored zones to their respective properties, as described in document US2022207971A1.

According to a non-illustrated example, the rankings may directly be represented as labels and/or properties of the edges which connect the cameras, monitored zones and/or the non-monitored zones with one another. In other words, the edges may comprise data and/or metadata representing labels and/or properties of the edges, such as the aforementioned rankings. The data and/or metadata may be represented above, over and/or below the edges.

According to a non-illustrated embodiment of the present disclosure, the knowledge graph may be in the form of a directed labelled graph. Note however that the edges may also be in the form of solid lines (i.e. undirected edges), so long as the computer is configured to determine the meaning of these edges. These undirected edges may also comprise data and/or metadata representing labels and/or properties thereof, similarly to what has been described above in relation to the directed edges. The data and/or metadata may here again be represented above, over and/or below the edges.

The aforementioned rankings may reflect the fact that the object(s) and/or event(s) generally walk or respectively advance at a certain speed and that certain video cameras will be reached at a later stage.

According to the present disclosure, the ranking may be based on previously identified second (and/or any further and/or any subsequent) video cameras that were identified starting from a selected or predetermined first video camera.

According to another alternative, the second (and/or any further and/or any subsequent) application programs may be identified based on a past history of identified second (and/or any further and/or any subsequent) programs that were identified starting from a predetermined first application program.

The present disclosure further covers a computer program comprising instructions which, when the program is executed by a computer, cause the computer to carry out the method of any one of the aforementioned embodiments, embodiments and/or examples.

The present disclosure further covers a computer-readable data carrier (e.g. an HDD or SSD) having stored thereon the said computer program product.

The present disclosure further covers a video surveillance system configured to carry out the method of any one of the aforementioned embodiments, embodiments and/or examples. In such a case, the system comprises the said plurality of video cameras comprising the said first video camera and the said one or more second video cameras. Moreover, the said first video camera comprises means for performing the step of querying the knowledge graph and the said one or more second video cameras comprise(s) means for performing the step of identifying the said at least one second application program based on information received from the said first video camera, the information received identifying the said first application program and/or comprising the said first analytics data.

Advantageously, the system may comprise the operator client 120 as described above and/or a combination of different electronic devices, such as for instance an operator client 120, a management server 130 and a recording server 150 as described above.

In one embodiment of the present disclosure, the knowledge graph (and/or the static file and/or the dynamic file mentioned above) is stored on the management server 130. Alternatively, the knowledge graph (and/or the static file and/or the dynamic file mentioned above) may be stored on the operator client 120. By storing the knowledge graph on the operator client 120, each operator client 120 does not need to communicate with the management server 130 for each query of the knowledge graph, which increases the operating speed and reduces network traffic.

The said first and/or second (and/or any further and/or any subsequent) application programs may be stored and run on the analytics server 160 and/or client apparatus 120 as defined above. However, the present disclosure is not limited to this configuration.

The invention claimed is:

1. A computer-implemented method of video surveillance comprising the steps of:
   querying a knowledge graph representing a plurality of video cameras as ontology entities connected by edges, in order to identify, based on a first video camera providing a first video stream that can be fed to at least one first application program to obtain first analytics data, one or more second video cameras which can each provide a respective second video stream; and
   identifying, based on the first application program and/or based on the first analytics data, at least one second application program that can be fed with at least one second video stream to obtain second analytics data.

2. The method according to claim 1, wherein the first application program performs object and/or event detection in the first video stream to detect an object and/or an event of interest.

3. The method according to claim 2, wherein the first analytics data indicates a kind of object and/or event that has been detected in the first video stream.

4. The method according to claim 1, further comprising the step of launching and/or activating the at least one second application program based on the first analytics data, the first analytics data indicating that the object and/or event has disappeared or is about to disappear from the first video stream.

5. The method according to claim 1, wherein querying the knowledge graph based on the first video camera results in identifying a plurality of the said one or more second video cameras, the method further comprising the step of launching and/or activating only some of the video cameras amongst the second video cameras and/or feeding only some of their respective second video streams to respective second application programs, based on the first application program and/or based on the first analytics data.

6. The method according to claim 5, wherein the first application program performs object and/or event detection in the first video stream to detect an object and/or an event of interest, wherein activating only some of the video cameras amongst the second video cameras and/or feeding only some of their respective second video streams to respective second application programs comprises identifying one or more video cameras, different from the one or more first video cameras, whose field(s) of view can be reached by the object and/or event from the field(s) of view of the said one or more first video cameras within a first predetermined time.

7. The method according to claim 6, further comprising raising an alarm and/or logging on an entry in a log when the object and/or event has left a field of view of the said one first video camera or has disappeared or is about to disappear from the first video stream or has not reached a field of view of a second video camera or has not appeared in a second video stream of a second video camera, within a second predetermined time equal to or longer than the first predetermined time.

8. The method according to claim 1, wherein identifying the at least one second application program is based on the first analytics data.

9. The method according to claim 1, further comprising launching and/or activating, in anticipation of a potential appearance of the object and/or event in the second video stream, the at least one second application program based on the first analytics data, the first analytics data indicating that the object and/or event has disappeared or is about to disappear from the first video stream.

10. The method according to claim 1, wherein the first and second application programs are different instances of the same software program.

11. The method according to claim 1, wherein the first and second application programs are different software programs.

12. The method according to claim 1, wherein at least one of the first and second application programs is run in the first or second video camera, respectively.

13. The method according to claim 1, wherein at least one of the first and second application programs is run in a processing device remote from the first and second video cameras, respectively.

14. The method according to claim 13, wherein the processing device is a video management system which receives at least some of the video streams from the video cameras and allows a user to remotely control operation of at least one of the one or more video cameras.

15. The method according to claim 14, wherein the second analytics data is obtained or received by the video management system, the method further comprising causing the video management system to display the said second analytics data.

16. The method according to claim 14, further comprising causing at least the first video stream to be displayed in the video management system and causing the second video stream to be displayed in the video management system upon identification of the second video camera.

17. The method according to claim 13, wherein the processing device is a cloud-based system which receives a first or second video stream from a video management system which receives at least some of the video streams from the video cameras and allows a user to control operation of at least one of the one or more video cameras.

18. A video surveillance system configured to carry out the method of claim 1, the system comprising the said plurality of video cameras comprising the said first video camera and the said one or more second video cameras, wherein the said first video camera comprises means for performing the step of querying the knowledge graph and wherein the said one or more second video cameras comprise(s) means for performing the step of identifying the said at least one second application program based on information received from the said first video camera, the information received identifying the said first application program and/or comprising the said first analytics data.

19. A video surveillance system according to claim 18, wherein the first application program is configured to perform object and/or event detection in the first video stream to detect an object and/or an event of interest.

20. A non-transitory computer readable storage medium storing a program for causing a computer to execute a computer-implemented method of video surveillance comprising the steps of:
 querying a knowledge graph representing a plurality of video cameras as ontology entities connected by edges, in order to identify, based on a first video camera providing a first video stream that can be fed to at least one first application program to obtain first analytics data, one or more second video cameras which can each provide a respective second video stream; and
 identifying, based on the first application program and/or based on the first analytics data, at least one second application program that can be fed with at least one second video stream to obtain second analytics data.

* * * * *